(12) United States Patent　　(10) Patent No.: US 6,504,532 B1
Ogasahara et al.　　(45) Date of Patent: Jan. 7, 2003

(54) COORDINATES DETECTION APPARATUS

(75) Inventors: Tsutomu Ogasahara, Aichi (JP); Takahiro Ito, Aichi (JP); Kenichi Takekawa, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/577,496

(22) Filed: May 25, 2000

(30) Foreign Application Priority Data

Jul. 15, 1999 (JP) ............................................ 11-201572

(51) Int. Cl.$^7$ ................................................ G09G 5/00
(52) U.S. Cl. .......................... 345/175; 345/173; 362/31
(58) Field of Search ................................ 345/156, 173, 345/175, 176, 177; 178/18.01, 18.04, 18.09, 18.1; 362/31, 330

(56) References Cited

U.S. PATENT DOCUMENTS 6,352,351 B1 * 3/2002 Ogasahara et al. ......... 345/175

FOREIGN PATENT DOCUMENTS

JP　　9-091094　　4/1997

* cited by examiner

*Primary Examiner*—Kent Chang
(74) *Attorney, Agent, or Firm*—Oblon, Spivak, McClelland, Maier & Neustadt, P.C.

(57) ABSTRACT

A coordinates detection apparatus comprises two optical units each having a light emitter, a diffusion lens, a read lens, and a light-receiver. The optical units are provided at different positions on the border of a display surface. The light-emitter and light-receiver in each optical unit are so located that their optic axes are coincident. A recursive reflection section reflects the light emitted from the light-emitter and diffused by the diffusion lens in a fan form towards the light-emitter. The coordinates of a point specified on the display surface are detected by focusing the light reflected on the reflection section with the read lens, receiving the reflected light with the light-receiver, and determining the position where reception of the light is hindered.

9 Claims, 6 Drawing Sheets

COORDINATES DETECTION APPARATUS

FIELD OF THE INVENTION

The present invention relates to a coordinates detection apparatus which detects coordinates of a point specified on the surface of a panel such as a touch panel.

BACKGROUND OF THE INVENTION

There have been known various types of coordinates detection apparatus used, for instance, for touch panel. For example, such an apparatus is disclosed in Japanese Patent Laid-Open Publication No. HEI 9-91094. In the apparatus disclosed in this application, two optical units each having a light-emitter and a light-receiver are provided at different positions on the border of the surface of the touch panel, and further a reflection section which reflects a light emitted from the light-emitter in the direction from where the light was emitted on the border of the surface.

As mentioned above, the conventional coordinates detection apparatus has two optical units and a reflection section. Light from the light-emitter is projected parallel to the surface of the panel in the form of a fan. The light is reflected by the reflection section in the direction from where the light was emitted, that is, towards the light-emitter. The reflected light is received by the light-receiver. When a user touches a point on the surface of the panel, with a finger or the like, then the light passing through this point is interrupted. Therefore, there occur places in each of the light-receivers which do not receive the reflected light. Accordingly, from the position of such places in the light-receivers it is possible to calculate the coordinates of the point where the finger of the like had touched the surface of the panel.

The coordinates detection apparatus disclosed in Japanese Patent Laid-Open Publication No. HEI 9-91094 has following disadvantages. The optic axis of the light-emitter and the light-receiver have an angle between them. Therefore, the light-emitter and light-receiver must be located with a specified space therebetween. This makes it difficult to reduce a size of the optical unit which comprises the light-emitter and the light-receiver.

Furthermore, a lens is provided in front of the light-receiver in the path of the reflected light. This lens forms an image on the light-receiver. Because the optic axis of the light-emitter and the light-receiver have an angle between them, there is a problem that, the center of the light projected from the light-emitter and diffused in the form of a fan is offset from the center of the lens provided in front of the light-receiver. Resultantly, there is a disadvantage that the precision in detection of the coordinates is low.

SUMMARY OF THE INVENTION

It is an object of the present invention to provide a coordinates detection apparatus which makes it possible to reduce a size of the optical unit used therein.

It is another object of the present invention to provide a coordinates detection apparatus which insures high precision in detection of the coordinates.

According to the coordinates detection apparatus of one aspect of the present invention, optic axis of the light-emitter and the light-receiver are coincident to each other. Therefore, the light-emitter and light-receiver can be located at positions close to each other.

Further, the half mirror is located on the optic axes of the light-emitter and light-receiver. Therefore, the light-emitter and light-receiver can be located at any positions by making use of this half mirror.

Further, the light-emitter, diffusion lens, read lens, and half mirror are mounted in one frame. Therefore, the size of the optical unit can be reduced.

Further, a central point of emission of light diffused by the lens and a principal point of the read lens are coincident to each other.

Further, the optical unit has an optical adjustment mechanism for the light-emitter and light-receiver. Therefore, the light-emitter and light-receiver in each optical unit can be adjusted discretely.

Further, the optical unit is located at a position close to the display surface. Therefore, optic axes of the light-emitter and the light-receiver can be located at a position close to the display surface.

Further, there is provided a mounting position adjustment mechanism for adjusting a mounting position of the optical unit. Therefore, precision in detection of the coordinates can be improved by adjusting a mounting position of the optical unit.

Other objects and features of this invention will become apparent from the following description with reference to the accompanying drawings.

DESCRIPTION OF THE PREFERRED EMBODIMENTS

Figure 1:
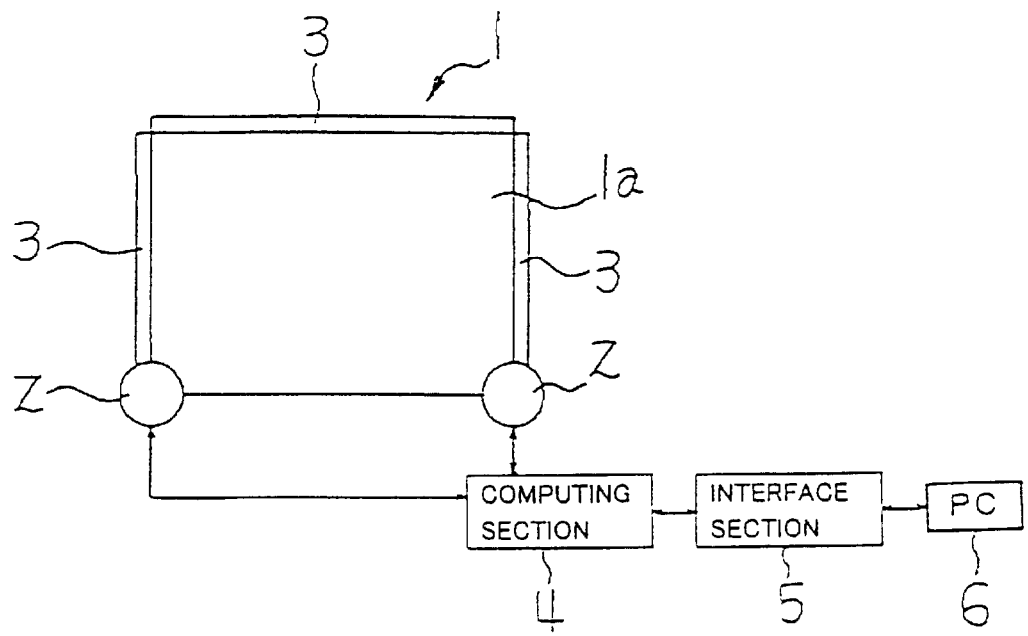
FIG. 1 is a general flat view showing basic configuration of a first embodiment of the present invention.

A first embodiment of the present invention is described below. FIG. 1 is a general flat view showing basic configuration of the present invention. A panel face 1a which is a display surface is provided in a touch panel 1. The panel face 1a has a rectangular shape. Two optical units 2 are located at two corners of the border of the panel face 1a. Further, a reflection section 3 is located along three borders. That is, the reflection section 3 is not provided along the border that has the optical units 2 at its ends. A recursive reflection sheet with trihedral cubes provided at a high density therein is provided in the reflection section. Signals from the two optical units 2 are input into a computing section 4. This computing section 4 is connected to a personal computer 6 through an interface section 5.

Figure 5:
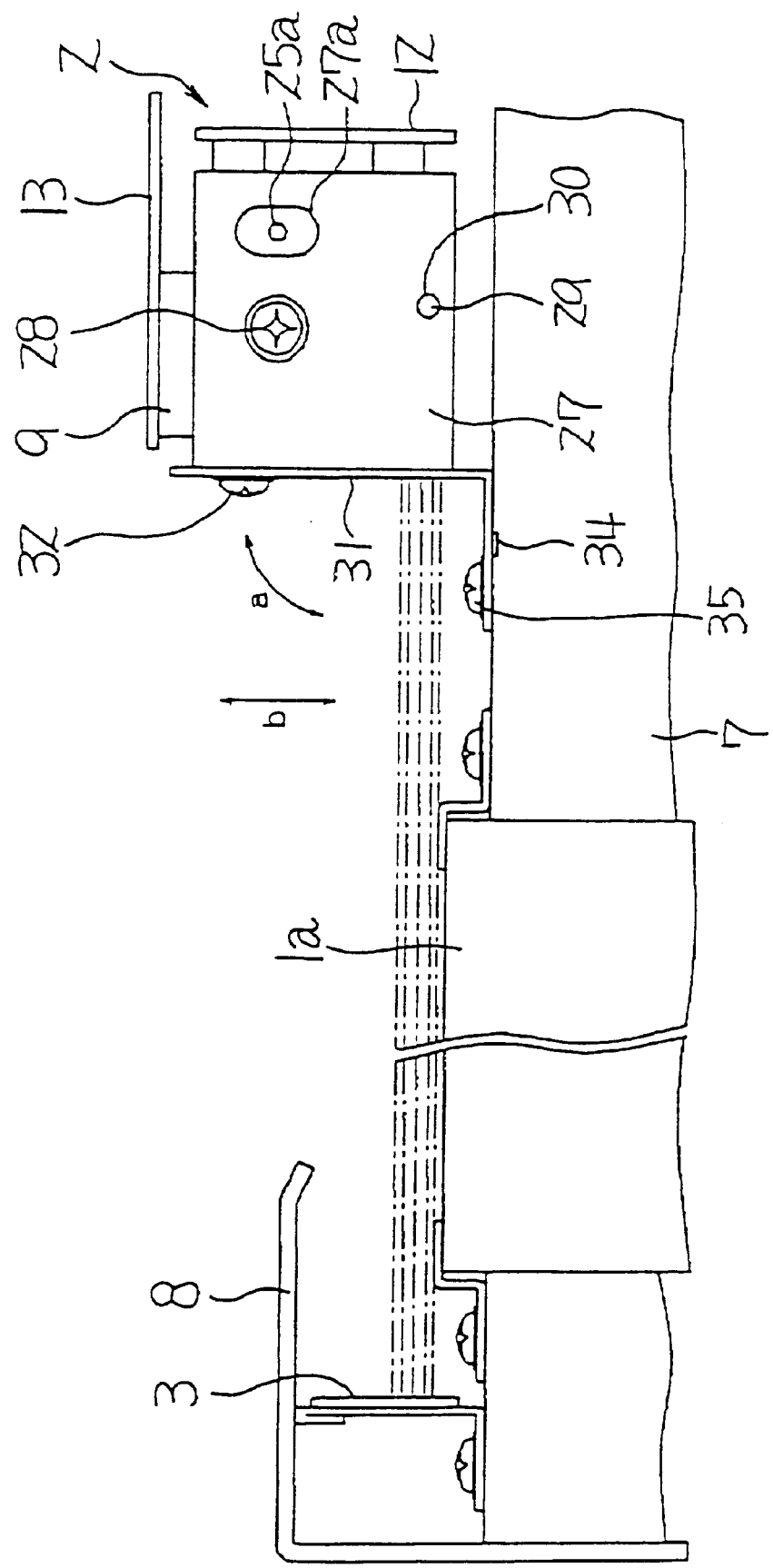
FIG. 5 is a front view showing a mounting structure of the optical unit.

A frame 7 is provided around the panel face 1a (see FIG. 5). The optical units 2, reflection section 3, and a casing covering the reflection section 3 are mounted on this frame 7.

Figure 2:
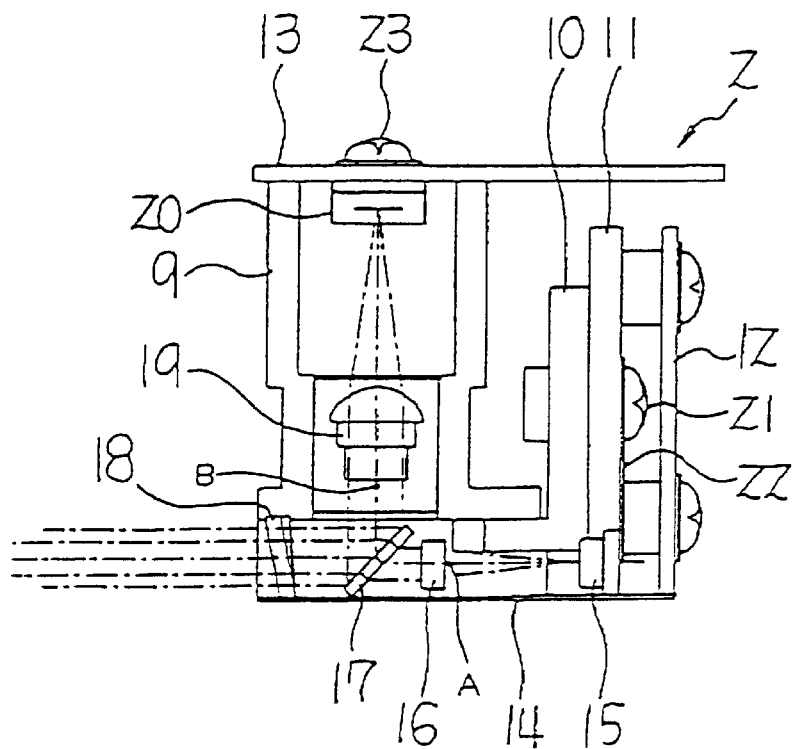
FIG. 2 is a longitudinal cross-sectional view showing internal structure of the optical unit.
Figure 3:
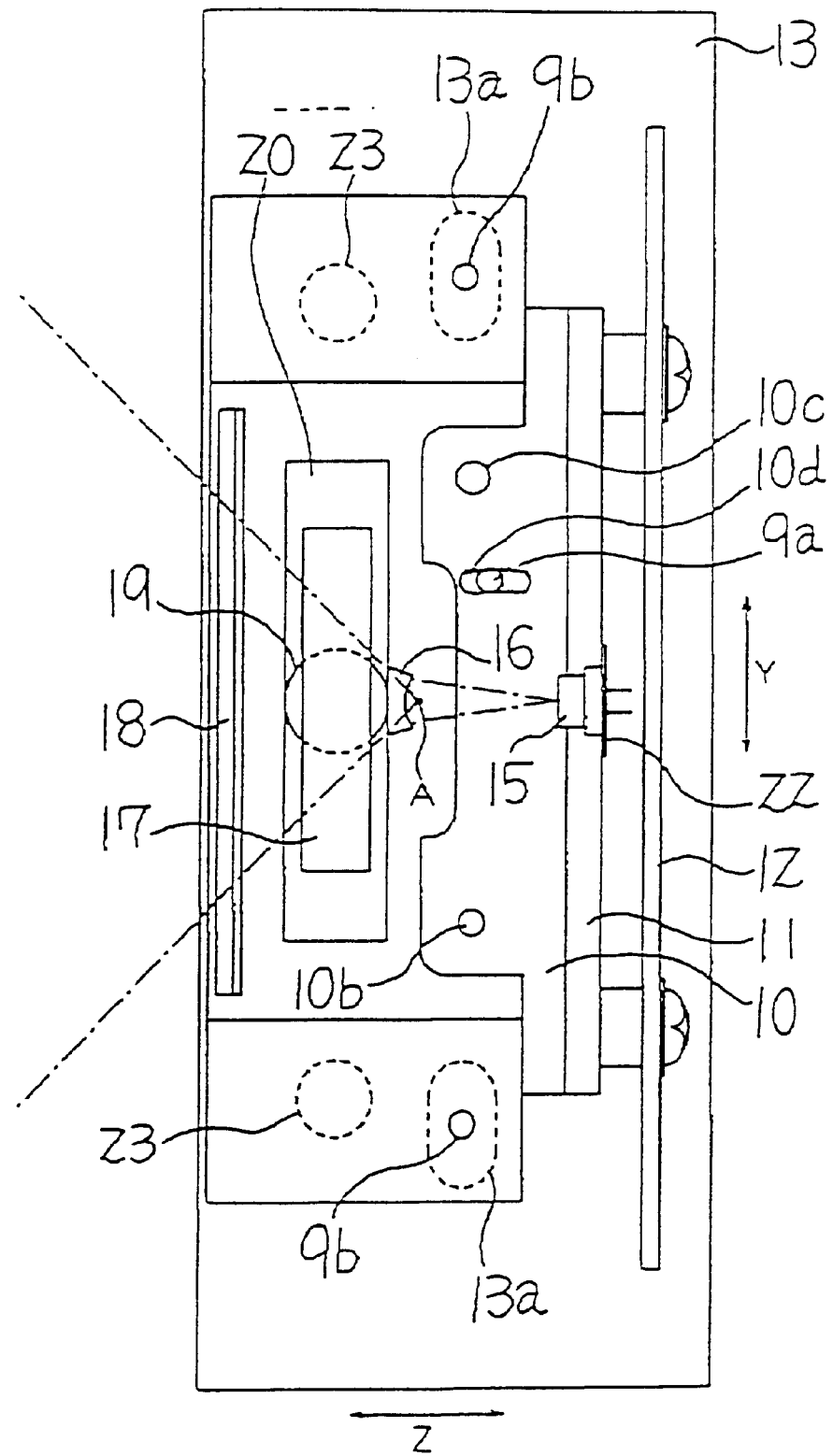
FIG. 3 is a bottom view showing internal structure of the optical unit.
Figure 4:
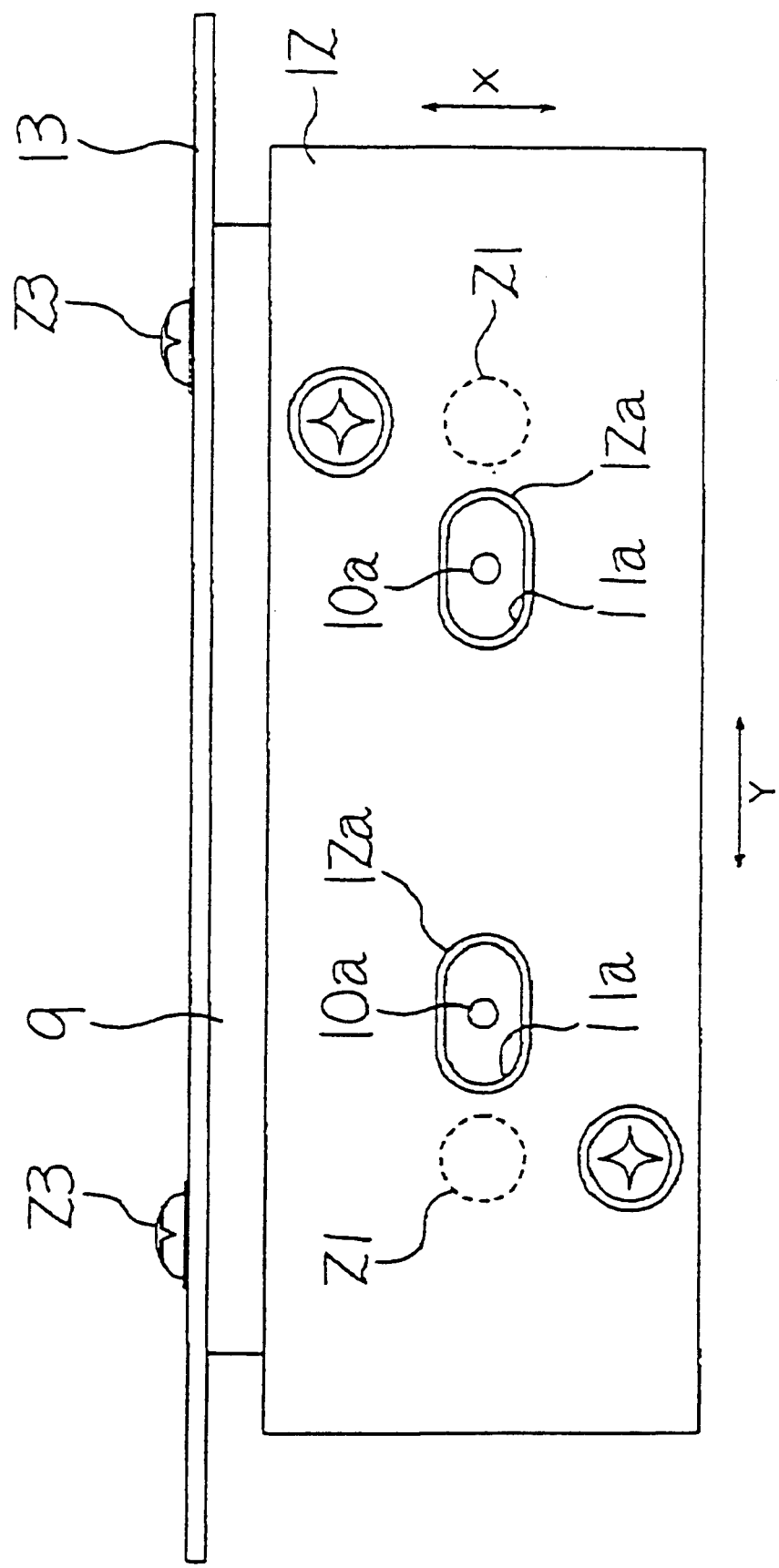
FIG. 4 is a side view showing the optical unit.

FIG. 2 is a longitudinal front view showing an internal structure of the optical unit 2. FIG. 3 is a bottom view showing the optical unit. FIG. 4 is a side view showing the optical unit. In the optical unit 2, a frame 9, a first holding plate 10, a second holding plate 11, circuit boards 12, 13, a rear plate 14, and other components are provided. A light-emitter 15, a diffusion lens 16, a half mirror 17, protection glass sheet 18, a read lens 19, and a CCD 20 which is a light-receiver are mounted on the frame 9.

A laser beam is projected from the light-emitter 15 under controls by the computing section 4, and the laser beam projected from the light-emitter 15 is diffused by the diffusion lens 16 in parallel to the panel face 1a and in a fan form (having a central angle of 90 degrees herein), and hits the half mirror 17. A half quantity of the laser beam which hits the half mirror 17 passes through the half mirror 17, and a remaining half quantity of the laser beam is reflected in a direction to the rear plate 14. The laser beam having passed through the half mirror 17 further passes through the protection glass sheet 18, progresses straightly, hits the reflection section 3, and then is reflected in a direction to the light-emitter. The laser beam which is reflected on the reflection section 3 and returns in the direction to the light-emitter passes through the protection glass sheet 18, and hits the half mirror 17. A half quantity of the laser beam which hits the half mirror 17 transmits the half mirror 17 and progresses straightly in a direction to the light-emitter 15, while a remaining half quantity of the laser beam is reflected to the read lens 19, focused by the read lens 19 onto the CCD 20, and is received by the CCD 20.

The protection glass sheet 18 is provided to prevent foreign materials such as dusts or a finger of a touch panel user from entering the frame 9. This protection glass sheet 18 is inclined by 6 degrees against the vertical direction to the panel face 1a so that, even if a laser beam progressing to the reflection section 3 is reflected, when passing through the protection glass sheet 18, on a surface of this protection glass sheet 18, the reflected light is reflected in a direction where the reflected light is not received by the CCD 20.

Optic axes of the light-emitter 15 and the CCD 20 are coincident to each other and the half mirror 17 is located on these optic axes. Further a central point "A" of light emission of the laser beam diffused by the diffusion lens 16 and a principal point "B" of the read lens 19 are coincident to each other.

The circuit board 12 which controls and drives the light-emitter 15 is connected to the light-emitter 15, while the circuit board 12 which controls and drives the CCD 20 is connected to the CCD 20. The circuit board 12 is fixed to a second holding plate 11, and this second holding plate 11 is fixed with a screw 21 to a first holding plate 10. Further a plate spring 22 is tightened and fixed with the screw 21, and with the plate spring 22, the light-emitter 15 is pressed to and positioned against the second holding plate 11.

A pair of lengthy holes 11a for adjustment are formed on the second holding plate 11, and further round holes 10a are formed at positions opposite to the lengthy holes 11a for adjustment provided on the first holding plate 10 (Refer to FIG. 4). When the screw 21 is loosened, an eccentric pin (not shown) is inserted through the round hole 10a as well as through the lengthy hole 11a, and the second holding plate 11 is slid or the eccentric pin is rotated, the second holding plate 11 can be adjusted in the vertical direction (in the direction indicated by the arrow X) and in the horizontal direction (in the direction indicated by the arrow Y). By adjusting a position of the second holding plate 11 in the vertical direction or in the horizontal direction, it is possible to adjust the position of the light-emitter 15 in the vertical direction as well as in the horizontal direction, and the lengthy hole 11a for adjustment and the round hole 10a are part of an optical adjustment mechanism of the light-emitter 15. An escape hole 12a, into which the eccentric hole is inserted, is formed on the circuit board 12.

Two round holes 10b, 10c, into which a screw (not shown) for fixing the first holding plate 10 to the frame 9 is inserted, are formed on the first holding plate 10 (Refer to FIG. 3). One round hole 10b is formed with the same diameter as that of the screw, while the other round hole 10c is formed with a diameter larger than that of the screw. Further a lengthy hole 10d for adjustment is formed on the first holding plate 10, and a round hole 9a is formed at a position opposite to the lengthy hole 10d for adjustment on the frame 9. When the screw jointing the first holding plate 10 to the frame 9 is loosened, an eccentric pin (not shown) is inserted into the round hole 9a and lengthy hole 10d for adjustment, and the pin is rotated, the first holding plate 10 is rotated around the screw inserted into the round hole 10b, thus the position of the light-emitter 15 being adjusted back and forth (in the direction indicated by the arrow Z). By adjusting the position of the first holding plate 10 back and forth, a position of the light-emitter 15 can be adjusted back and forth, and the round holes 10b, 10c, lengthy hole 10d for adjustment, and round hole 9a are part of an optical adjustment mechanism of the light-emitter 15.

The circuit board 13 is fixed with a screw 23 to the frame 9, and the CCD 20 is fixed to the circuit board 13. Further a pair of length holes 13a for adjustment are formed on the circuit board 13, and round holes 9b are formed at positions opposite to the lengthy holes 13a on the frame 9 (Refer to FIG. 3). When the screw 23 is loosened, an eccentric pin (not shown) is inserted into the round hole 9b and lengthy hole 13a for adjustment, the circuit board 13 is slid, or the eccentric pin is rotated, the circuit board 13 can be adjusted back and forth (in the direction indicated by the arrow Z) and in the horizontal direction (in the direction indicated by the arrow Y). By adjusting the circuit board 13 back and forth or right and left, a position of the CCD 20 can be adjusted back and forth or right and left. The lengthy hole 13a for adjustment and round hole 13a are part of an optical adjustment mechanism of the CCD 20.

Figure 6:
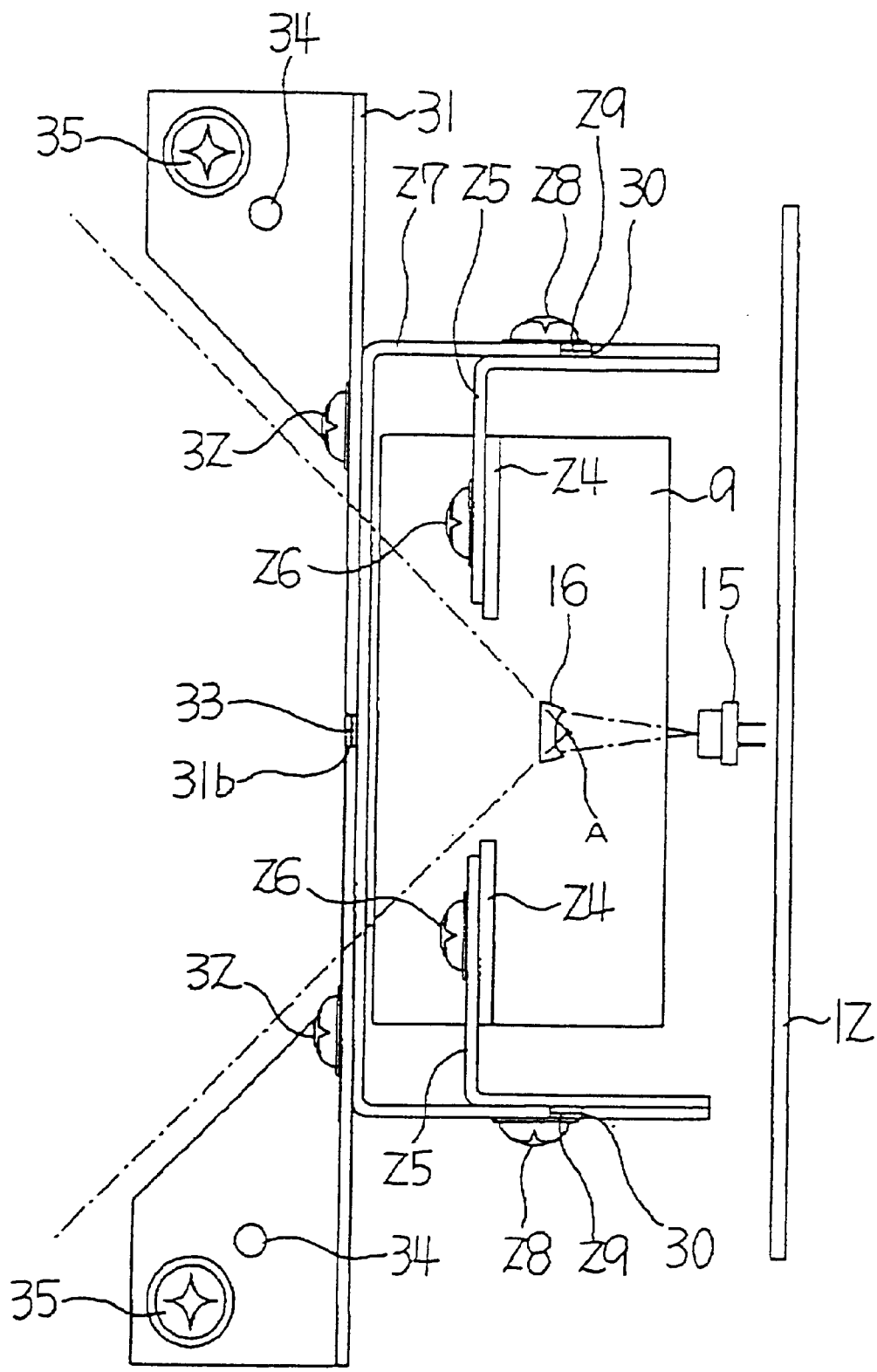
FIG. 6 is a flat view showing a mounting structure of the optical unit.
Figure 7:
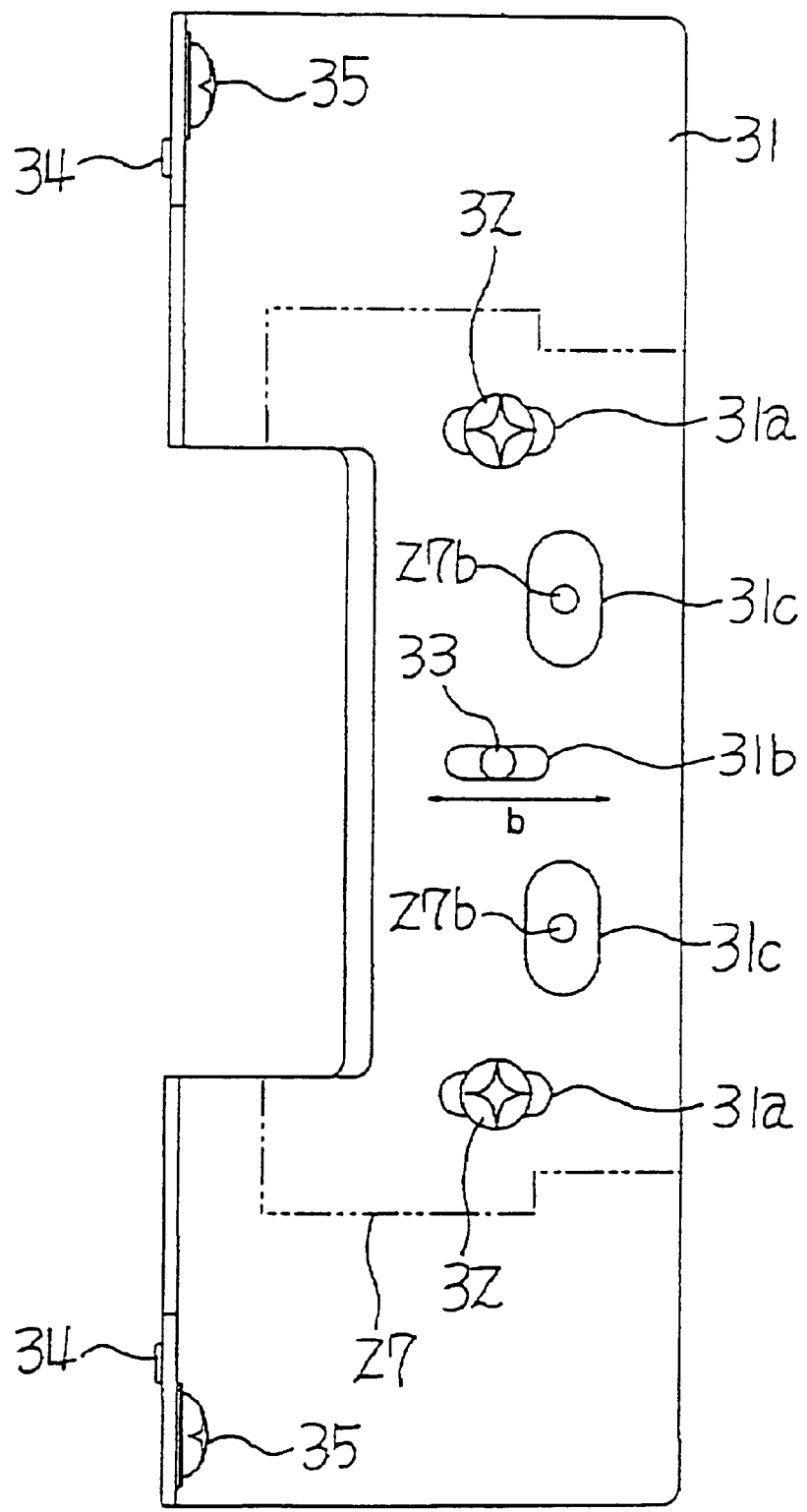
FIG. 7 is a side view showing a mounting structure of the optical unit.

FIG. 5 through FIG. 7 shows a structure for mounting the optical unit 2 onto the frame 7 and a mounting position adjustment mechanism, and FIG. 5 is a front view, FIG. 6 is a flat view, and FIG. 7 is a side view. A pair of projections 24 are formed on an external peripheral surface of the frame 9 with an L-shaped bracket 25 fixed with a screw to each of the projections 24, and a -shaped bracket 27 is fixed to each of the brackets 25.

On the bracket 25, a half-blanked projection 29 is formed at a position opposite a central point "A" of emission of the laser beam diffused by the diffusion lens 16 when the bracket 25 is viewed from the front side, and an engagement hole 30 in which the projection 29 is engaged in is formed on the bracket 27.

On two side faces of the bracket 27 fixed onto the bracket 25 with screws, a lengthy hole (not shown) and a lengthy hole 27a for adjustment, into which the screw 28 is inserted, are formed, and round holes 25a are formed at positions opposite to the lengthy holes 27a on the bracket 25 (see FIG. 5). When the screw 28 is loosened and an eccentric pin (not shown) is inserted into the round hole 25a and the lengthy hole 27a for adjustment to rotate the bracket 25, the frame 9 and bracket 25 rotate around the projection 29 engaged in the engagement hole 30 in a direction indicated by the arrow a. With this operation, a mounting position of the optical unit 2 can be adjusted. The lengthy hole 27a and round hole 25a are part of the mounting position adjustment mechanism for the optical unit 2.

A fixing plate 31 is fixed with a screw 32 to the bracket 27. A pair of lengthy holes 31a, a lengthy hole 31b positioned on the optic axis, and a pair of lengthy holes 31c for adjustment are formed on the fixing plate 31. The screw 32 for jointing the fixing plate 31 to the bracket 27 is passed through the lengthy hole 31a, a half-blanked projection 33 formed on the bracket 27 is engaged in the lengthy hole 31b, and round holes 27b are formed at positions opposite to the lengthy holes 31c on the bracket 27. When the screw 32 is loosened and an eccentric pin (not shown) is inserted into the round hole 27b and lengthy hole 31c for adjustment to rotate the bracket 27, the bracket 27 can be slid in a direction where the projection 33 slides along the lengthy hole 31b (in the direction indicated by the arrow b). With this operation, a mounting position of the optical unit 2 can be adjusted. Therefore the lengthy hole 31c for adjustment and round hole 27b are part of a mounting position adjustment mechanism of the optical unit 2.

Joint of the fixing plate 31 to the frame 7 is executed by engaging a half-blanked projection 34 formed on the fixing plate 31 in a hole section (not shown) of the frame 7 and tightening the screw 35. Further the optical unit 2 is located at a position where optic axes of the light-emitter 15 and CCD 20 are close to a surface of the panel face 1a.

With the configuration as described above, a laser beam projected from the light-emitter 15 is diffused by the diffusion lens 16, the diffused laser beam passes through the half mirror 17 and protection glass sheet 18, progresses to the reflection section 3, is reflected on the reflection section 3, progresses on the same optic axis, and returns to the optical unit 2. The light beam then returns to the optical unit 2, passes through the protection glass sheet 18, and is reflected by the half mirror 17 to the side of CCD 15. The reflected laser beam is focused by the read lens 19 onto the CCD 20, and is detected by the CCD 20.

When a position on the panel 1a is touched, for instance, by a finger in this state, a laser beam passing through the position is intercepted by the laser beam, and a point where the reflected light is not received is generated in the CCD 20 in each of the optical units 2. By computing the points from a result of detection with the detected CCD 20 (the computing is executed based on a principle of triangulation), the coordinates of the point touched with a finger or the like can be detected.

In the coordinates detection apparatus according to the present invention, optic axes of the light-emitter 15 and the CCD 20 are coincident to each other and the half mirror 17 is located on these optic axes. Because of this configuration, the light-emitter 15 and CCD 20 can be located at any positions close to each other, which enables size reduction of the optical unit 2 and improvement in the designing freedom.

Further a central point of emission of the light diffused by the diffusion lens 16 and a principal point "B" are coincident to each other, so that precision in detection of the coordinates can be improved. In addition, as the optical unit 2 is located at a position close to the panel face 1a, a optic axis of the light-emitter 15 and that of the CCD 20 can be located at positions close to a surface of the panel face 1a, which insures higher precision in detection of the coordinates. Further, as the optical unit 2 is located at a position close to the panel face 1a, a height and a size of the touch panel 1 become smaller, which enables size reduction of the touch panel 1.

The light-emitter 15, diffusion lens 16, read lens 19, and half mirror 17 are mounted to the frame 9, which enables further size reduction of the optical unit 2. In addition, a number of components used for assembly of the optical unit 2 becomes smaller, which results in cost reduction.

The optical unit 2 has an optical adjustment mechanism for the light-emitter 15 comprising the lengthy holes 11a for adjustment and round holes 10a, an optical adjustment mechanism for the light-emitter 15 comprising the round holes 10b, 10c, lengthy hole 10d for adjustment, and round hole 9a, and an optical adjustment mechanism for the CCD 20 comprising the lengthy holes 13a for adjustment and the round hole 9b, so that optical adjustment for the light-emitter 15 and CCD 20 can be executed for each optical unit 2 discretely, and in addition optical adjustment can be performed before the optical unit 2 is assembled to the touch panel 1, which insures excellent performance of the optical unit 2.

A mounting position of the optical unit attached to the frame 7 can be adjusted by a mounting position adjustment mechanism comprising the lengthy holes for adjustment and the round holes 25a and a mounting position adjustment mechanism comprising the lengthy holes 31c and round holes 27b, and with this adjustment, precision in detection of the coordinates can be improved.

According to the coordinates detection apparatus of one aspect of the present invention, optic axis of the light-emitter and the light-receiver are coincident to each other. Therefore, the light-emitter and light-receiver can be located at positions close to each other. Accordingly, the size of the optical unit can be reduced considerably.

Further, the half mirror is located on the optic axes of the light-emitter and light-receiver. Therefore, the light-emitter and light-receiver can be located at any positions by making use of this half mirror. Accordingly, freedom in designing can be increased highly.

Further, the light-emitter, diffusion lens, read lens, and half mirror are mounted in one frame. Therefore, the size of the optical unit can be reduced. Furthermore, cost reduction can be achieved by reducing a number of components used for assembly of the optical unit.

Further, a central point of emission of light diffused by the lens and a principal point of the read lens are coincident to each other. Therefore, precision in detection of the coordinates can be improved.

Further, the optical unit has an optical adjustment mechanism for the light-emitter and light-receiver. Therefore, the light-emitter and light-receiver in each optical unit can be adjusted discretely. In addition, optical adjustment of the optical unit can be performed before the optical unit is assembled into a device such as a touch panel. This arrangement insures an excellent performance of the optical unit.

Further, the optical unit is located at a position close to the display surface. Therefore, optic axes of the light-emitter and the light-receiver can be located at a position close to the display surface. This insures higher precision in detection of the coordinates.

Further, there is provided a mounting position adjustment mechanism for adjusting a mounting position of the optical unit. Therefore, precision in detection of the coordinates can be improved by adjusting a mounting position of the optical unit.

The present document incorporates by reference the entire contents of Japanese priority document, JP 11-201572 filed in Japan on Jul. 15, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinates detection apparatus comprising:

a display surface;

two optical units provided at different positions on the border of said display surface, each of said optical unit having a light emitter, a diffusion lens, a read lens, and a light-receiver; and a recursive reflection section located at the border of said display surface and which reflects a light emitted from said light-emitter and diffused by said diffusion lens in a fan form towards said light-emitter;

wherein said light-emitter and said light-receiver are so located that their optic axes are coincident, wherein the coordinates of a point specified on said display surface are detected by focusing the light reflected on said reflection section with said read lens, receiving the reflected light with said light-receiver, and determining the position where reception of the light is hindered.

2. The coordinates detection apparatus according to claim 1, wherein a half mirror is located on the optic axes of said light-emitter and said light-receiver.

3. The coordinates detection apparatus according to claim 2, wherein said light-emitter, said diffusion lens, said read lens, said light-receiver, and said half mirror are mounted in a frame.

4. The coordinates detection apparatus according to claim 1, wherein the center of the light diffused by said diffusion lens and a principal point of said read lens are coincident to each other.

5. The coordinates detection apparatus according to claim 1, wherein said optical unit has a mechanism which optically adjusts said light-emitter and said light-receiver.

6. The coordinates detection apparatus according to claim 1, wherein said optical unit is located at a position close to said display surface.

7. The coordinates detection apparatus according to claim 1, further comprising:

a mounting position adjustment mechanism which adjust a mounting position of said optical unit.

8. The coordinates detection apparatus according to claim 1, wherein said light emitted from said light-emitter and diffused by said diffusion lens is parallel to said display surface.

9. The coordinates detection apparatus according to claim 1, wherein said light emitted from said light-emitter and diffused by said diffusion lens is parallel to the reflected light.

* * * * *